July 7, 1959　　　J. F. HILL ET AL　　　2,893,097
TAKE-UP AND LATCHING DEVICE
Filed Dec. 3, 1956

INVENTORS:
Joseph F. Hill,
William C. Whitcomb,
Donald J. VanHorn,
by Charles S. Haughey
Their Attorney.

United States Patent Office 2,893,097
Patented July 7, 1959

2,893,097

TAKE-UP AND LATCHING DEVICE

Joseph F. Hill, Columbus, William C. Whitcomb, Hilliards, and Donald J. Van Horn, Columbus, Ohio, assignors to Surface Combustion Corporation, Toledo, Ohio, a corporation of Ohio Application December 3, 1956, Serial No. 625,818

9 Claims. (Cl. 24—279)

This invention relates generally to a fastening device and more particularly to a device for doubly and detachably securing the ends of a constricting band used to establish a sealing connection between the ends of aligned metal conduits.

This invention is directed to an improved constrictor band fastener, the principal advantages of which are simplicity, double and positive latching engagement, and rapid yet easy assembly and disassembly. The advantage of double and positive latching engagement is of particular importance whenever the band fastener is used as a tube connector for jet aircraft tubing wherein high temperatures and pressures pose a problem. In the event of failure of a latching member it is not only desirable but important to maintain the sealing engagement among the component parts of the connection until such time that the defective latch component may be replaced.

There are instances where it is imperative that conduit systems maintain their function even during failure of one of its components, such as in jet aircraft cabin pressuring systems. Should a latch on a tube connector used in such a system fail, it would be but a matter of seconds until the cabin would be de-pressurized and result not only in a loss of property but lives as well. Thus the value of a safety or secondary latch on a tube connector in such a system can readily be appreciated.

The principal object of this invention is to provide a novel and improved device for positively taking up the ends of a constrictor band, and doubly and detachably latching them together with the greatest of ease.

Toward the attainment of the foregoing object, the invention contemplates a take-up latching mechanism employing primary and secondary latching means.

The preferred primary latching means embodies a T-bolt having a threaded portion stepped down from the shank which in latched engagement extends through the slotted cradle of a T-trunnion member; a lock-nut threaded on the threaded end of the bolt; and the T-head of the bolt, with journal bearings circumposed about its trunnion elements, and the trunnion element of the T-trunnion member journaled in the respective bifurcated looped ends of a constrictor band. The dimensions of the T-bolt shank, threaded end, and slot of the T-trunnion member may be so inter-related that the threaded end may pass into the slot longitudinally of the axis of the slot while the shank may only enter axially therein.

The preferred secondary latching means embodies a flexible barbed tang or stem member extending from the looped end in which the T-trunnion member of the primary latching means is journaled, and an aperture in the opposing looped ends for receiving the barb of the tang member in locking engagement when the locknut of the primary means is tightened.

The combination of the primary and secondary latching mechanisms provides a double lock which deters coupling failures. Should the primary mechanism fail, the secondary mechanism will maintain the seal.

For a further consideration of what I believe to be novel and my invention, attention is directed to the following specification and drawing and the concluding claims thereof.

Referring now to the drawing in which like characters are used to designate the same or similar parts throughout the several figures of the drawing.

Figure 1:
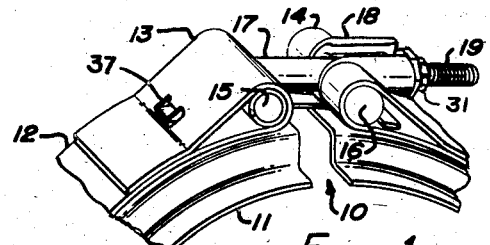
Fig. 1 is a fragmentary perspective view of an actuator ring of a tube coupling showing the take-up and latch mechanism in operative engagement.

In Fig. 1 the take-up and latch mechanism is designated generally by the numeral 10 and for the purpose of illustration is shown in operative engagement with a segmented actuator ring 11 of an aircraft type conduit coupling. A flexible metallic constrictor band 12 is adapted to substantially circumpose a tubular member or conduit, in this instance the actuator ring 11. The ends of the metallic strip constituting the constrictor band are bent to form loops or journal members 13 and 14 to respectively receive a T-bolt 15 in one and a T-trunnion member 16 in the other. It is to be understood that the loops or journal members 13 and 14 of the constrictor band 12 need not be integral parts of said band but may be separately formed members secured to the band. However, for manufacturing economy it is preferable that the journal members be integral parts of the band.

Figure 5:
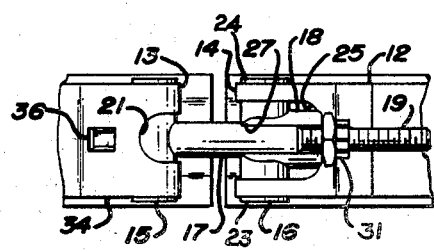
Fig. 5 is a fragmentary perspective of a forged T-bolt head showing how the journal bearings are positioned over a machined trunnion end.

The constrictor band journals 13 and 14 are bifurcated to permit T-bolt shank 17 and T-trunnion cradle 18 to extend from their respective journals and to allow pivotable movement therein. The T-bolt 15, with shank 17 and a threaded end 19 of reduced cross section, has T-head 20 with journal bearings 28 and 29 pressed on its ends (Fig. 5) journalled in bifurcated loop 13 and the shank 17 extending through the slot 21 of the loop 13 while the T-trunnion member 16 has trunnion elements 23 and 24 journalled in the respective portions of the bifurcated loop 14, and cradle 18 bore to receive the shanks 17 extending through the slot 25 of said loop 14. The bore 26 is provided with a slot or passage 27 to permit easy insertion of the threaded portion of the T-bolt 15 longitudinally into the cradle 18 but is of such dimension as to reject longitudinal insertion of the shank 17 and thus limit the insertion of the shank axially into said bore 26. The end face of cradle 18 is adapted to provide a shoulder 30 on which a lock nut 31 bears as it is threaded upon the T-bolt 15 and slidably draws the shank 17 through bore 26.

A flexible tang or stem member 35 is rigidly secured to loop 14 and extends toward loop 13 beneath shank 17 when the latch mechanism 10 is in an engaged position. The journal bearings 28 and 29 are of sufficient thickness to provide the necessary clearance for the tang 35 to pass beneath shank 17 and also provide the required bearing area. In the rearward wall 34 of loop 13 is provided an aperture 36 to receive and engage the barbed projection 37 of tang 35 as the resilence of the band 12 carrying the tang causes it to move radially outward.

Figure 2:
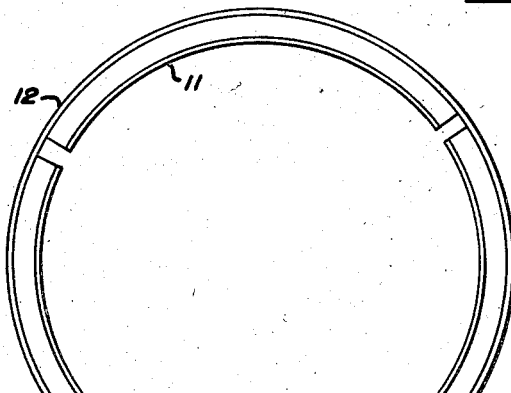
Fig. 2 is a plan view of the latching mechanism and constricting band in an open position.
Figure 3:
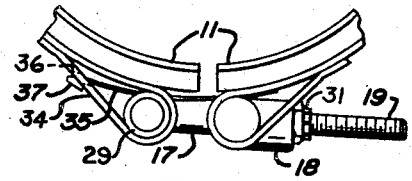
Fig. 3 is a view similar to Fig. 2, with only a fragment of the constricting band showing, and with the latching mechanism in a closed position.
Figure 4:
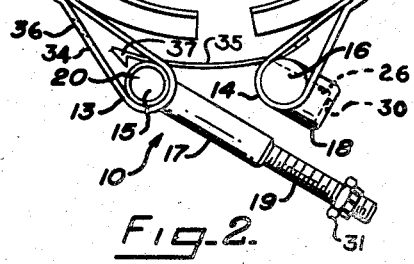
Fig. 4 is an elevational view of the latching mechanism shown in a closed position.
Figure 7:
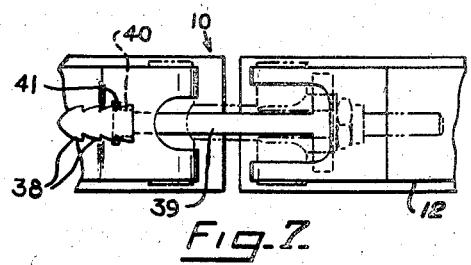
Fig. 7 is an elevational view of an alternate secondary latch with the primary latch means shown in phantom.

Although a single projection 37 is shown in Figs. 2, 3 and 4 to engage the wall 34 when the ends of band 12 are drawn together with the desired degree of tightness, the tang 39 may be serrated to provide a series of projections 38 (as shown in Fig. 7) and present a plurality of engaging positions.

In this embodiment the aperture 40 is provided with a slotted portion 41 to facilitate passage of the projections 38. The flexibility of the tang 39 causes the tang to spring from the slotted portion to the aperture 40 proper while the resilience of the band 12 causes one of the projections 38 to engage the side wall of the aperture 40.

Figure 6:
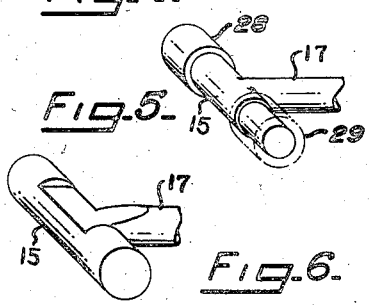
Fig. 6 is a fragmentary perspective view of an alternate T-bolt head.

In the cases where it is not desired to employ journal bearings on the T-head 20, the T-head may be cut away as shown in Fig. 6 to provide the necessary clearance for tang 35 to pass beneath.

In operation the two ends of the flexible band 12 are manually drawn together and T-bolt 15 is pivoted from the position as indicated in Fig. 2 into operative engagement with threaded portion 19 of T-bolt 15 disposed through passage 25 into bore 26 of the trunnion member 16. As the lock nut 31 is threaded the shank 17 is slidably drawn to and through the bore 26 of the trunnion member 16 as shown in Fig. 3. Concurrently the tang 35 slides beneath the T-bolt 15 through the slot 21 of loop 13 and hence through aperture 36 to engage wall 34. In the embodiment shown in Fig. 2 the arrangement and dimensions of the tang may be so interrelated with the other components of the latch mechanism that when the ends of the band are drawn together with a pre-calculated desired degree of tightness the projection 37 will snap into engagement. It is manifest if the T-bolt fails or becomes disengaged in some manner, the tang 35 in spring-biased cooperative engagement with wall 34 will maintain the tightness of the clamp band 12.

The advantages of the invention in simplicity, positiveness of latching and rapid assembly and disassembly will be apparent to those skilled in the art from the foregoing description of the preferred embodiment of the invention. It will also be apparent to those skilled in the art and many modifications of structure may be made within the principles and scope of the invention, which are not to be regarded as limited by the detailed description of the preferred embodiment thereof.

We claim:

1. A take-up and fastening device for detachably securing the ends of a flexible band circumscribing a member to be clamped comprising first and second loops attached to the ends of said band; a bolt pivotably disposed in the first of the loops; a nut threadably mounted on said bolt; a bolt receiving member pivotably disposed in the second loop; and a flexible tang extending outwardly from said second loop; and said first loop having an aperture through its walls for engaging said tang when disposed therethrough; the combination of said bolt, said nut and said bolt receiving member forming a first locking means, and a combination of said tang and said apertured wall forming a second locking means.

2. The take-up and fastening device as described in claim 1 wherein said bolt is provided with a chamfered portion to facilitate passage of said tang through said first loop.

3. A take-up and fastening device for detachably securing the bifurcated ends of a flexible band circumscribing a member to be clamped comprising: first and second loops formed by doubling back the ends of said band; a T-bolt having a trunnion pivotably disposed in the first of said loops; a nut threadably mounted on said bolt; and a preformed member pivotably disposed in the second loop, said member being provided with a bore therethrough transverse to its pivotable axis, an open end slot extending radially from said bore and an end face forming a seat for said nut, said bolt having a shank partially threaded, said threaded portion being of reduced cross-section from that of the unthreaded shank portion and passing freely through the slot of the preformed member, said unthreaded shank portion being of greater diameter than the slot of the preformed member but substantially that of the bore as to be slidable therein upon tightening of the nut, which tightening engages the nut with the end face of the preformed member and draws the ends of the band together; a flexible tang, having hook-like projections transverse to its longitudinal axis, extending from beneath the second loop; and an aperture in the back wall of the first loop, said tang passing beneath said T-bolt through the bifurcated slot of said first loop and hence through the aperture of the back wall to lock the hook-like projections against the side of said aperture when the looped ends of the band are drawn together.

4. A fastening device for circumscribing a member to be clamped, comprising: a flexible band; a first member at one end of said band and extending outwardly therefrom; a latch member at the end of the band opposing said first member for engaging said first member and forming first locking means therewith to secure the ends of said band; a second member at one end of said band and extending outwardly therefrom, said second member being flexible; and means at the end of the band opposing said second member, said means having an aperture and being adapted to receive said second member through said aperture, the combination of said second member and the apertured means forming second locking means to secure the ends of the band.

5. A fastening device for circumscribing a member to be clamped, comprising: a flexible band, a first member at one end of said band and extending outwardly therefrom; a latch member at the end of the band opposing said first member for engaging said first member and forming first locking means therewith to secure the ends of said band; a flexible tang member at one end of said band and extending outwardly therefrom; and means through the end of the band opposing said tang member to receive said tang member, the combination of said tang member and said means forming second locking means to secure the ends of said band.

6. A fastening device for circumscribing a member to be clamped, comprising: a flexible band terminating at its ends in reversely bent loops; a first member attached to the loop at one end of said band and extending outwardly therefrom; a latch member attached to the loop at the end of the band opposing said first member for engaging said first member and forming first locking means therewith to secure the ends of said band; wall means at one end of said band having an aperture; and a second member attached to the end of the band opposing said wall means and extending outwardly therefrom, said second member being flexible and adapted to extend through said aperture, the combination of said second member and said wall means forming second locking means to secure the ends of said band.

7. A fastening device for circumscribing a member to be clamped, comprising: a flexible band having looped ends; primary take-up and fastening means attached to said looped ends for detachably securing the ends of said band; and a flexible tang member extending outwardly from one of said looped ends; the other of said looped ends having an aperture therethrough for receiving said tang member to form secondary fastening means.

8. The fastening device as described in claim 1 wherein the arrangement and dimensions of said secondary fastening means are so interrelated that when the primary fastening means is tightened to the desired limit the tang member will engage the looped end having the aperture.

9. A fastening device for circumscribing a member to be clamped, comprising: a flexible band terminating at its ends in reversely bent loops; a first member attached to the loop at one end of said band and extending outwardly therefrom, said one end having an aperture through the looped portions thereof; a latch member attached to the loop at the other end of said band and adapted to receive said first member and forming first locking means therewith to secure the ends of said band; a second member attached to said other end of said band and extending outwardly therefrom, said second member being flexible and adapted to extend through said apertures, the combination of the apertured looped portions and said second member forming second locking means to secure the ends of said band.

References Cited in the file of this patent

UNITED STATES PATENTS

| | | |
|---|---|---|
| 875,019 | Wahlert | Dec. 31, 1907 |
| 1,284,325 | Hart | Nov. 12, 1918 |
| 1,804,725 | Walker | May 12, 1931 |
| 2,695,437 | Bernard | Nov. 30, 1954 |
| 2,816,343 | Decker | Dec. 17, 1957 |

FOREIGN PATENTS

| | | |
|---|---|---|
| 621,406 | Great Britain | Apr. 8, 1949 |